April 4, 1967  MASAHARU NARA  3,312,395
CALCULATOR
Filed Sept. 23, 1965  5 Sheets-Sheet 1
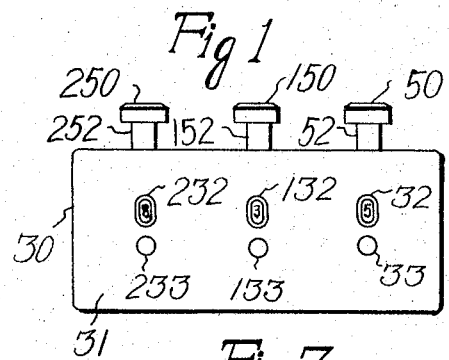
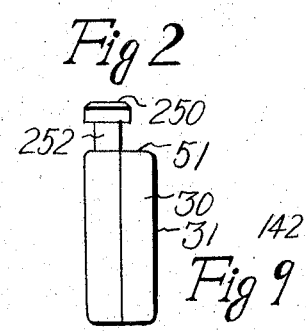
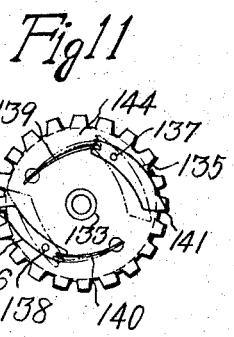
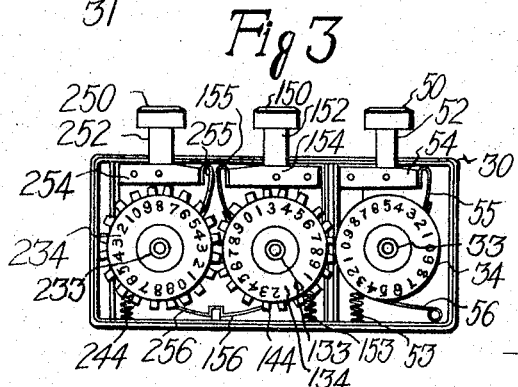
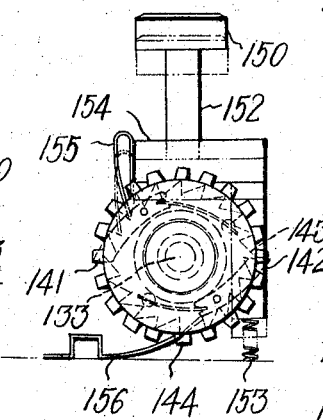
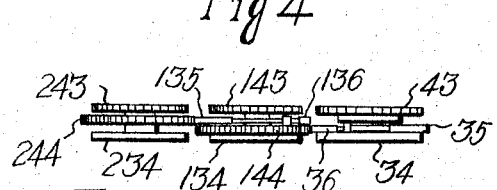
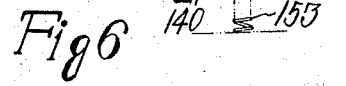
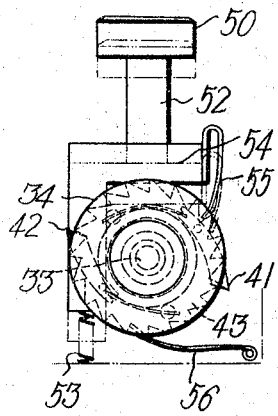
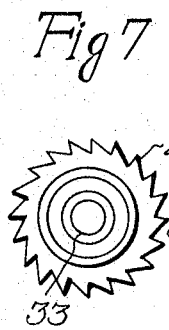
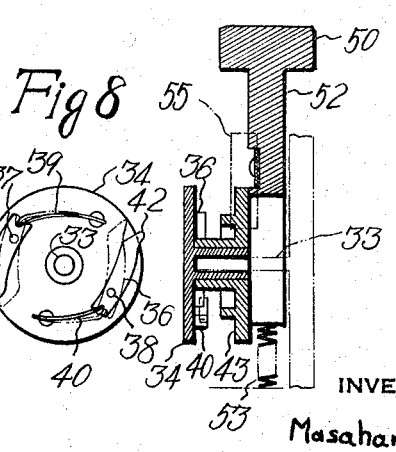
INVENTOR
Masaharu Nara
BY Eyre, Mann & Lucas April 4, 1967  MASAHARU NARA  3,312,395
CALCULATOR
Filed Sept. 23, 1965  5 Sheets-Sheet 2
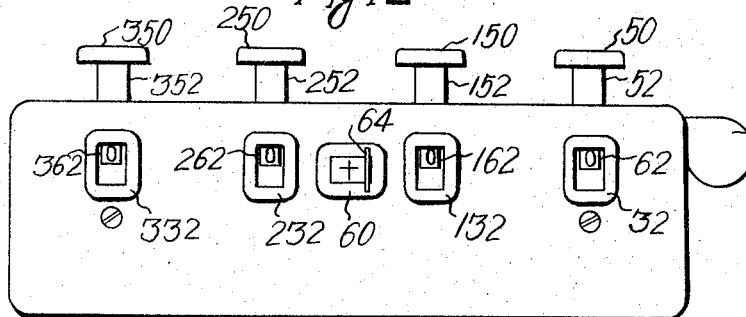
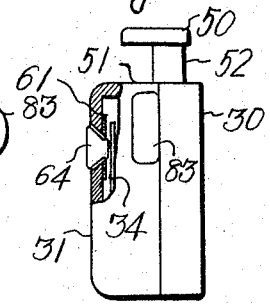
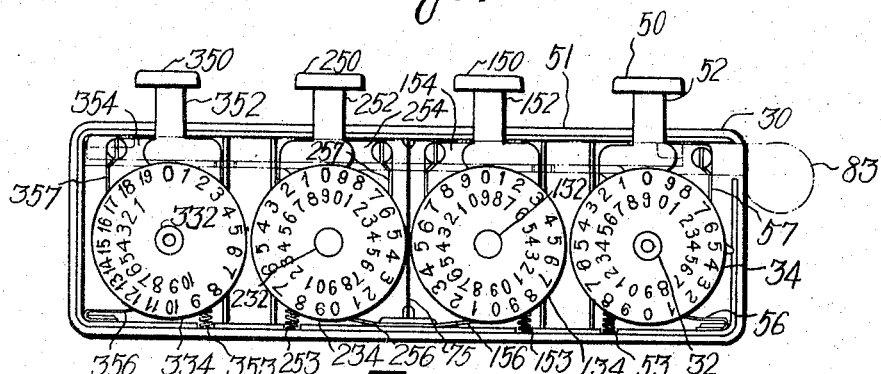
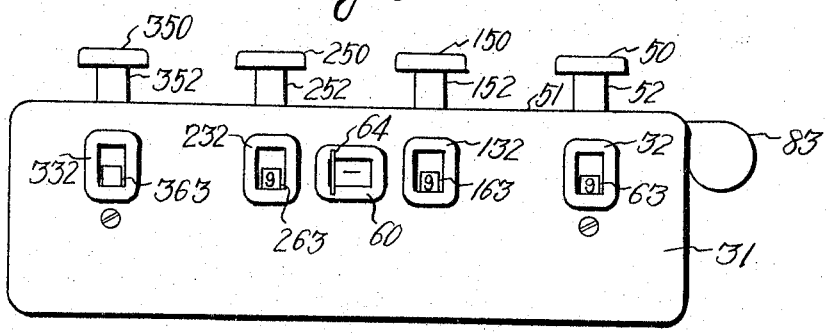
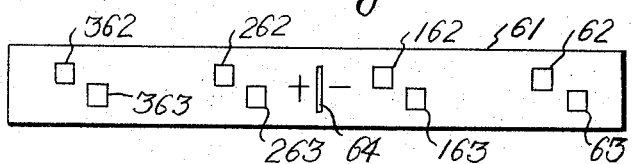
INVENTOR
Masaharu Nara
BY
Eyre, Mann & Lucas

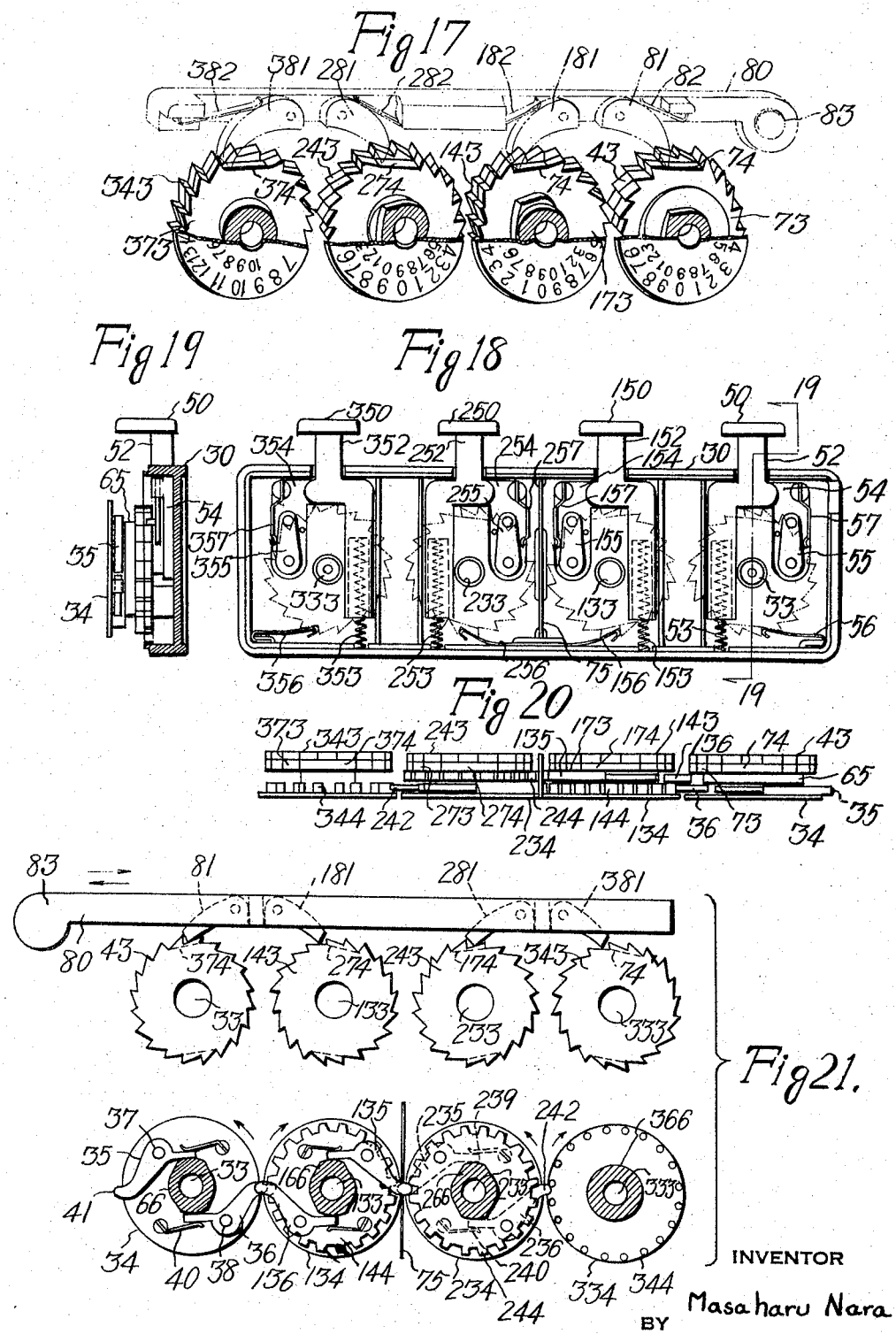

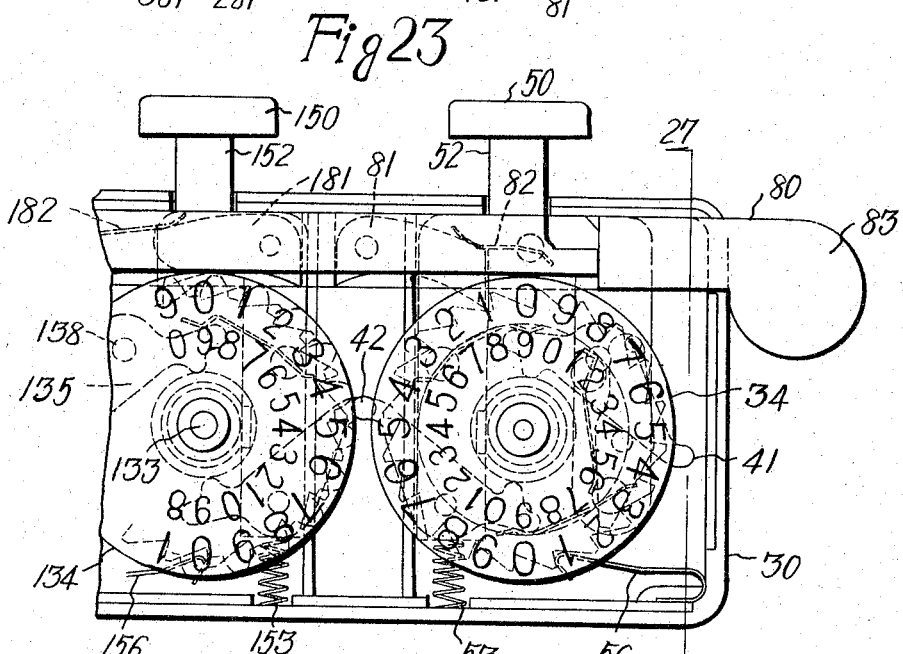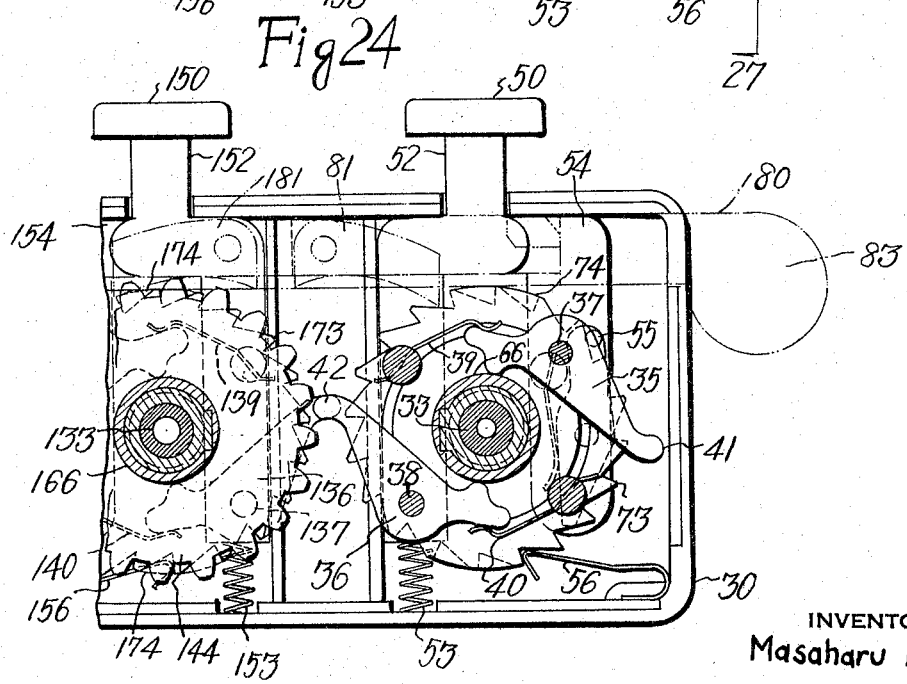

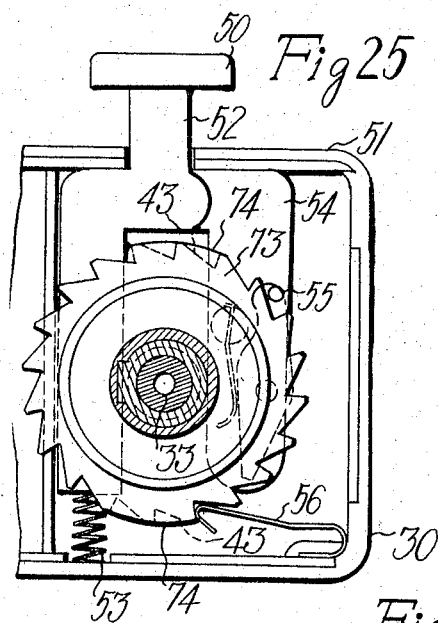
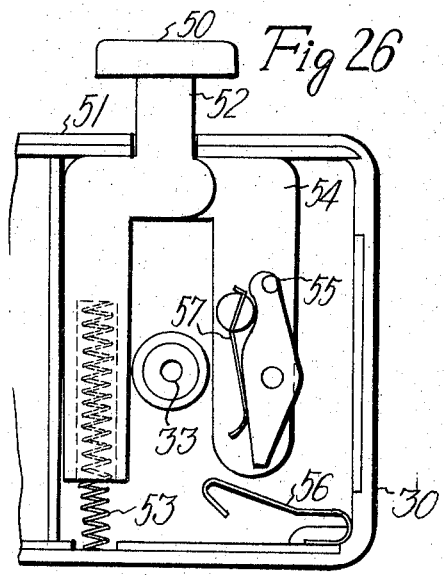
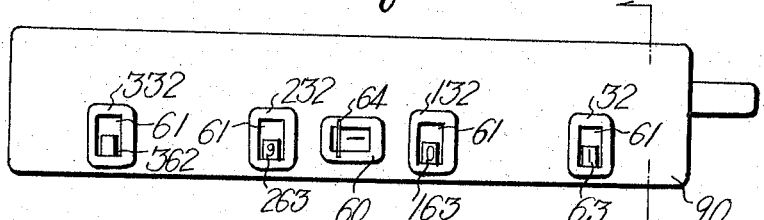
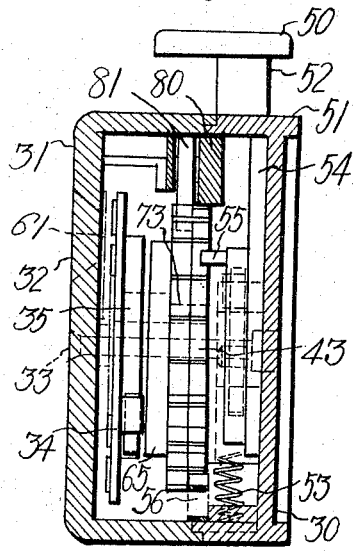
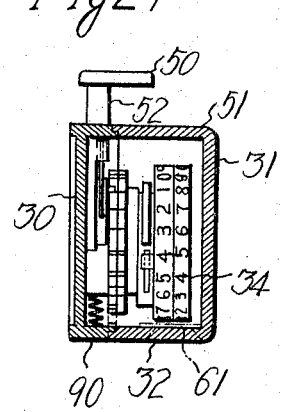

United States Patent Office 3,312,395
Patented Apr. 4, 1967

3,312,395
CALCULATOR
Masaharu Nara, 9 Aioi-cho, Itabashi-ku, Tokyo, Japan
Filed Sept. 23, 1965, Ser. No. 489,490
9 Claims. (Cl. 235—114)

This invention relates to improvements in a calculator for addition and subtraction.

Heretofore, the calculator is not practically portable in general. Some calculators proposed to be portable are neither efficient in use nor durable.

One object of this invention is to provide a manual calculator which is small-sized enough to be taken hold in one hand.

Another object of this invention is to provide a calculator which has a minimum of working parts and is efficient in use.

Still another object of this invention is to generally improve and simplify the means for, and the method of, operations of addition and subtraction.

Further another object of this invention is to generally improve and simplify the structure of such portable calculator whereby they may be cheaply produced and satisfactorily operated for a very considerable length of time without requiring any repairs and attention.

Briefly stated in accordance with one aspect of this invention, there is provided a calculator comprising a casing having a number of windows formed through a wall thereof, a number of push buttons provided above the top wall thereof, and a number of figure indicating mechanisms provided inside thereof. Each of the windows, push buttons, and figure indicating mechanisms is provided for each of places of numerals to be calculated. The figure indicating mechanism comprises an indicating disk, a tens-toothed gear, and a tens-toothed ratchet wheel. They are integrated one after another and mounted rotatably inside the casing. The indicating disk is adapted to expose in the window a digit marked on a surface of the disk. The ratchet wheel is adapted to be rotated by one tooth by pushing down the push button so as to substitute the just neighbouring digit for the exposed digit in the window. And the indicating disk has at least a claw lever pivoted thereon which is adapted to engage with the gear belonging to the just neighbouring upper place so as to rotate the latter by one tooth when the last-named indicating disk exposes the digit "0" marked thereon in the window to effect a 10's carry and the claw lever is adapted not to be driven by the gear.

The invention will be better understood and other objects and additional advantages of the invention will become apparent upon perusal of the following description taken in connection with the drawings, in which:

FIG. 1 is a front elevational view of an adder for adding three-figured numbers embodying the principles of this invention;

FIG. 2 is a side elevational view thereof;

FIG. 3 is a vertically sectional front elevational view thereof showing the inside of the casing;

FIG. 4 is a partly removed plan view thereof showing the interrelation among the indicating disk, gear, and ratchet wheel;

FIG. 5 is a partly removed front elevational view of the figure indicating mechanism for the unit place;

FIG. 6 is a partly removed vertically sectional right side elevational view thereof;

FIG. 7 is a front elevational view of the ratchet wheel;

FIG. 8 is a rear elevational view of the indicating disk;

FIG. 9 is a partly removed front elevational view of the figure indicating mechanism for the place of ten;

FIG. 10 is a partly removed vertically sectional right side elevational view thereof;

FIG. 11 is a rear elevational view of the gear thereof;

FIG. 12 is a front elevational view of a calculator for adding and subtracting four-figured numbers further embodying the principles of this invention, which is set in the addition position;

FIG. 13 is a partly sectional right side elevational view thereof;

FIG. 14 is a vertically sectional front elevational view thereof showing the inside of the casing;

FIG. 15 is a similar view to FIG. 12 but showing the calculator set in the subtraction position;

FIG. 16 is a front elevational view of the laterally slidable plate;

FIG. 17 is a partly removed perspective view of the figure indicating mechanisms;

FIG. 18 is a vertically sectional front elevational view of the calculator showing the deep inside of the casing;

FIG. 19 is a vertically sectional right side elevational view thereof taken along the line 19—19 of FIG. 18;

FIG. 20 is a top plan view of the figure indicating mechanism thereof;

FIG. 21 is an explanatory partly exploded view for showing interrelation of the laterally slidable rod with the figure indicating mechanism;

FIGURE 22 is a partly removed front elevational view of the laterally slidable rod;

FIGS. 23 to 27, inclusive, are views showing still another embodiment of this invention, which is very similar to the preceding embodiment; and FIGS. 28 and 29 show further another embodiment of this invention.

Referring more particularly to the drawings, the preferred embodiments of this invention will now be described; however, this description will be understood to be illustrative of the invention and not as limiting it to the particular construction shown and described. Reference numeral 30 generally indicates the casing of what will be termed an adder, which is so sized as being possible to be taken hold in one hand. The front wall 31 of this casing 30 is provided with three windows 32, 132, 232 for indicating digits of places of a unit, ten, and hundred of three-figured numbers, respectively. Three horizontal spindles 33, 133, and 233 are fixed to the casing longitudinally. Three digit indicating disks 34, 134, and 234 are rotatably mounted on the spindles 33, 133, and 233, respectively. The front surface of each digit indicating disk carries two series of ten digits in the Arabic figures arranged along a circle concentric with the disk. The digits of the unit place and the place of hundred are arranged in the counterclockwise direction and the digits of the place of ten are arranged in the clockwise direction.

A pair of claw levers 35 and 36 are swingably pivoted on pivots 37 and 38 protruded rearwards from two symmetrically arranged points on the rear surface of the digit indicating disk 34, respectively. The inner ends of the claw levers 35 and 36 are loaded with leaf springs 39 and 40, of which the opposite ends are fixed to the disk, so as to elastically protrude the outer ends 41 and 42 of the claw levers 35 and 36 out of the periphery of the digit indicating disk 34, respectively. A ratchet wheel 43 formed with clockwise rotatable twenty teeth is arranged behind the claw levers 35 and 36 coaxially with the digit indicating disk 34 and fixed integrally therewith.

A twenty-toothed gear 144 is fixed integrally and arranged coaxially with and behind the ten place indicating disk 134 and adapted to engage with the outer ends 41 and 42 of the claw levers 35 and 36 belonging to the abovementioned unit place indicating mechanism, respectively. A pair of claw levers 135 and 136 are swingably pivoted on pivots 137 and 138 protruded rearwards from two symmetrically arranged points on the rear surface of the gear 144 similarly to the above-described rear surface of the digit indicating disk 34. The inner ends of the claw levers 135 and 136 are loaded with springs 139 and 140 so as to protrude the outer ends 141 and 142 of the claw levers 135 and 136 out of the periphery of the ten place indicating disk 134, respectively. A ratchet wheel 143 is arranged counterclockwise rotatably behind the claw levers 135 and 136 and coaxially with the ten place indicating disk 134 and fixed thereto integrally, as shown in FIGS. 3, 4, 9, and 10.

A twenty-toothed gear 244 is fixed integrally and arranged coaxially with and behind the hundred place indicating disk 234 and adapted to engage with the outer ends 141 and 142 of the claw levers 135 and 136, respectively. A ratchet wheel 243 is arranged clockwise rotatably behind the gear 244 and coaxially with the hundred place indicating disk 234 and fixed thereto integrally.

There are three operating push buttons 50, 150, and 250 above the top surface 51 of the casing 30. These push buttons 50, 150, and 250 have downward extending legs 52, 152, and 252, which are adapted to be slidable vertically inside the casing 30 and tended to be forced upwards by the action of coil springs 53, 153, and 253, respectively. The legs 52, 152, and 252 have lugs 54, 154, and 254 inside the casing 30, respectively. Elastic pawl elements 55, 155, and 255 are fixed to the ends of the lugs 54, 154, and 254, of which the lower ends are adapted to engage with the teeth of the ratchet wheels 43, 143, and 243, respectively. As stated above, the ratchet wheel 143 is counterclockwise rotatable, so that it is necessary that the ratchet wheel 43 and 243 are pushed down by the pawl elements 55 and 255 by their right sides while the ratchet wheel 143 is pushed down by the pawl element 155 by its left side. There are three leaf springs 56, 156, and 256 which serve to check reverse turns of the three ratchet wheels 43, 143, and 243 always engaging elastically therewith, respectively.

In operation, when the push button 50 is pushed down, the ratchet wheel 43 is rotated by one tooth in the clockwise direction. The unit place indicating disk 34 is integrally fixed with the ratchet wheel 43 so that the former is also rotated by one tooth of the ratchet wheel 43 in the clockwise direction whereby a digit exposed in the window 32 for indicating the unit place is substituted by the one higher digit. For example, "5" is substituted for "4" adding "1" thereto. When the above operation is repeated twice, the still one higher digit is exposed in the window 32. In case, for example, "3" is to be added to "2" and "0" is exposed in the unit place indicating window 32, an operator may push down the button 50 twice so as to indicate the summand "2" in the window 32 and then he may push down the button 50 still three times so as to enter the addend "3," whereby he may find the sum "5" exposed in the window 32.

In case the unit place indicating window 32 exposes "9" and "1" is to be added thereto, the unit place indicating disk 34 is rotated by one tooth of the ratchet wheel 43 by pushing down the push button 50 once so as to substitute the indication of "0" for the "9." At the same time, the pivot 37 of the claw lever 35 is revolved as a part of the unit place indicating disk 34 along the same angle with the rotation of the ratchet wheel 43 so as to bring the outer end 41 of the claw lever 35 into engagement with the gear 144 belonging to the ten place indicating mechanism, whereby the gear 144 and the ten place indicating disk 134 integrated therewith are rotated by one tooth of the ratchet wheel 143 in the counterclockwise direction so that for a digit exposed in the ten place indicating window 132 the one higher digit is substituted. In such a manner as above a carrying up operation is done. For example, the ten place indicating disk 134 exposing "2" is affected by the one pushing down operation of the push button 50 for adding "1" to the "9" indicated in the window 32 for the unit place so that the indication "2" is changed to "3" in the ten place while the indication "9" is changed to "0" in the unit place. Thus the indication "29" in toto becomes "30."

It is to be understood therefore that there are necessary conditions in numbers of digits and teeth of the ratchet wheels 43, 143, and 243 and the gears 144 and 244. Arrangement of the claw levers 35, 36, 135, and 136 with respect to the digits indicated on the front surface of the disks 34, 134, and 234 also requires a condition. As far as the decimal system is concerned, it is necessary that ten digits are successively positioned at least once, for example, twice as in this embodiment, along a circle concentric with the indicating disk itself on the front surface thereof, as shown in FIG. 3. They must be arranged at a regular interval so that the interval of the digits marked on the front surface as well as two adjacent teeth of the gears 144 and 244 and the ratchet wheels 43, 143, and 243 must be an angle of $360°/10n$. For example, in this embodiment, the angle is $360°/20$. In other words, the gears 144 and 244 and the ratchet wheels 43, 143, and 243 in this embodiment are provided with twenty teeth, respectively. The claw levers 35 and 36 are provided to cooperate with the two "0's" marked along a circle on the front surface of the unit place indicating disk 34 and the claw levers 135 and 136 are provided to cooperate with the two "0's" marked along a circle on the front surface of the ten place indicating disk 134, so that it is necessary that, when the digit "0" is exposed in the windows 32 and 132, either of the outer ends 41 and 42 and either of the outer ends 141 and 142 of the claw levers are engaged with the gears 144 and 244, respectively.

While the claw levers 35, 36, 135, and 136 are provided for driving the gears 144 and 244 of the one higher place indicating mechanisms, respectively, as above, it is impossible to drive the claw lever carrying mechanism from the one higher place indicating mechanism, respectively. That is, when a tooth of the gears 144 and 244 pushes the outer ends 41, 42, 141, and 142 of the claw levers 35, 36, 135, and 136, the latter do not rotate the indicating mechanism on which the claw levers are pivoted, but merely inwards swing on the pivots 37, 38, 137, and 138 so as to advance the tooth, respectively.

Reference is now made to FIGS. 12 to 22, inclusive, illustrating a calculator for operating addition and subtraction in accordance with the principles of this invention. Reference numeral 30 generally indicates the casing of what will be termed a calculator, which is so sized as being possible to be taken hold in one hand. The front wall of this casing 30 is provided with four indicating windows 32, 132, 232, and 332 for indicating numerals of places of a unit, ten, hundred, and thousand of four-figured numbers, respectively, and an operating window 60. A laterally slidable plate 61 is arranged just behind these windows 32, 132, 232, 332, and 60 and provided with four pairs of perforations 62, 63, 162, 163, 262, 263, 362, and 363 and a frontwards protruded knob 64 in such a manner that the knob 64 is adapted to be inserted frontwards into the operating window 60 and be shiftable laterally from a right position to a left position or vice versa. The right position is to be termed the plus position or addition position and the left position is the minus position or subtraction position. When the knob 64 takes the plus position, the four perforations 62, 162, 262, and 362 are adapted to be overlaid with the four indicating windows 32, 132, 232, and 332 and when the knob 64 takes the minus position, the other four perforations 63, 163, 263, and 363 are adapted to be overlaid with the same four windows, respectively, as shown in FIGS. 12 to 16.

Similarly to the preceding embodiment, there are spindles 33, 133, 233, and 333 inside the casing 30. An indicating disk 34 and a ratchet wheel 43 are mounted on the spindle 33. Three indicating disks 134, 234, and 334, three ratchet wheels 143, 243, and 343, and three gears 144, 244, and 344 are mounted on the spindles 133, 233, and 333, respectively. In this embodiment, there is one more ratchet wheel 73, 173, 273, and 373 for each of the four indicating mechanisms for resetting operation. These four ratchet wheels 73, 173, 273, and 373 are arranged in front of the other four ratchet wheels 43, 143, 243, and 343 coaxially and integrally therewith and distinguished by the provision of toothless parts, which will be referred to hereinafter, respectively.

As in the preceding embodiment, the unit place set of the four digit indicating mechanisms consists of the unit place digit indicating disk 34, the front ratchet wheel 73, and the rear ratchet wheel 43 integrated one after another. The unit place indicating disk 34 has a front surface carrying two concentric circles of two series of ten digits in the Arabic figures. The digits of the outer circle for operating addition are arranged in the counterclockwise direction and the inner circle for operating subtraction are in the clockwise direction. It is also a necessary condition that the digit "0" in a circle is piled on the digit "9" in the other circle along a radius. In the unit place indicating mechanism, as in the preceding embodiment, there is not provided a gear so that there is necessary to provide a spacer 65 arranged between the cam-like member behind the unit place indicating disk 34 and the front ratchet wheel 73 in order to arrange the front ratchet wheel 73 laterally in alignment with the corresponding front ratchet wheel 173 of the adjacent ten place indicating mechanism.

A pair of claw levers 35 and 36 are swingably pivoted on pivots 37 and 38 protruded rearwards from two symmetrically arranged points on the rear surface of the unit place digit indicating disk 34, respectively. The inner ends of the claw levers 35 and 36 are loaded with leaf springs 39 and 40 so as to protrude the outer ends 41 and 42 of the claw levers 35 and 36 out of the periphery of the unit place digit indicating disk 34 and into the pitch circle of the gear 144 of the adjacent ten place indicating mechanism. The outer ends 41 and 42 are prevented from excessive protrusion by a cam-like member 66 mounted on the spindle 33 between the unit place digit indicating disk 34 and the spacer 65 in front of the front ratchet wheel 73.

The ten place digit indicating mechanism consists of a ten place indicating disk 134, a gear 144, a cam-like member 166, a front ratchet wheel 173, and a rear ratchet wheel 143. They are integrated one after another and counterclockwise rotatably mounted on the spindle 133. The gear 144 has a pair of claw levers 135 and 136 on its rear surface. The gear 144 and the two ratchet wheels 143 and 173 have twenty teeth, respectively.

The hundred place digit indicating mechanism consists of a hundred place digit indicating disk 234, a cam-like member 266, a gear 244, a front ratchet wheel 273, and a rear ratchet wheel 243. They are integrated one after another and clockwise rotatably mounted on the spindle 233. The hundred place digit indicating disk 234 has a pair of claw levers 235 and 236 on its rear surface. The gear 244 and the two ratchet wheels 273 and 243 have twenty teeth, respectively.

The thousand place digit indicating mechanism consists of a thousand place digit indicating disk 334, a spacing member 366, a front ratchet wheel 373, and a rear ratchet wheel 343. In this mechanism, an open-side lantern wheel 344 is formed on the rear surface of the digit indicating disk 343 so as to substitute for a gear. There is not a claw lever in this mechanism due to the highest place in this embodiment.

Similarly to the preceding embodiment, the unit place mechanism and the hundred place mechanism are rotatable in the clockwise direction while the ten place mechanism and the thousand place mechanism are rotatable in the counterclockwise direction. This direction of rotation is not only for operating addition but also for operating subtraction. Therefore, the digits marked on the front surfaces of the indicating disks 34, 134, 234, and 334 are arranged in this line. In order to extend the scope of numbers to be handled, the numbers marked on the thousand place indicating disk 334 are not, in fact, two concentric circles of circularly arranged two series of digits, but are an outer circle of circularly arranged one series of numerals of from "0" to "19" and an inner semi-circle of one series of numerals of from "1" to "10" and the "9" of the outer circle is piled on the "10" of the inner circle. By virtue of this special indicating manner in the highest place numerals indicating disk, it is possible to indicate the largest number of "19999" as the largest sum in spite of the general provision for handling four-figured numbers, as shown in FIG. 14.

There are four push buttons 50, 150, 250, and 350 having legs 52, 152, 252, and 352 and lugs 54, 154, 254, and 354, respectively, similarly to the preceding embodiment. Pawl elements 55, 155, 255, and 355 are pivoted on the lugs 54, 154, 254, and 354 and adapted to drive the rear ratchet wheels 43, 143, 243, and 343 by virtue of springs 57, 157, 257, and 357, respectively. The rear ratchet wheels 43, 143, 243, and 343 are stabilized by virtue of leaf springs 56, 156, 256, and 356, respectively. Coil springs 35, 135, 235, and 335 are provided for tending to restore the push buttons 50, 150, 250, and 350, respectively, similarly to the preceding embodiment as shown in FIG. 18.

A laterally slidable rod 80 is arranged inside the upper part of the casing 30 and provided with four claws 81, 181, 281, and 381 as shown in FIGS. 14, 17, 21, and 22. The four claws 81, 181, 281, and 381 are pivoted on the laterally slidable rod 80 and loaded by leaf springs 82, 182, 282, and 382 facing the peripheries of the four front ratchet wheels 73, 173, 273, and 373 in such a manner that the rotations of the ratchet wheels in their proper directions are not disturbed, respectively. The right-hand end 83 of the laterally slidably rod 80 is extended out of the casing 30 as a knob for operating the rod 80. When the laterally slidable rod 80 is reciprocated by operating the knob 83 manually, the front ratchet wheels 73 and 273 are clockwise rotated by one tooth for one pulling motion or one rightward stroke and the front ratchet wheels 173 and 373 are counterclockwise rotated by one tooth by pushing motion of leftward stroke of the laterally slidable rod 80 so that, when the rod 80 is repeatedly reciprocated, all mechanisms are driven thereby in a hurried manner. As referred to hereinbefore, the four front ratchet wheels 73, 173, 273, and 373 have toothless parts 74, 174, 274, and 374 in their peripheries, respectively. When the claws 81, 181, 281, and 381 become in contact with the toothless parts, 74, 174, 274, and 374, it becomes impossible to drive the mechanisms by the reciprocation of the laterally slidable rod 80, respectively. In addition, the toothless parts 74, 174, 274, and 374 are arranged in such a manner that, when the claws 81, 181, 281, and 381 are in contact therewith, the "0's" marked in the outer circles on the front surfaces of the indicating disks 34, 134, 234, and 334 are positioned just to be exposed through the plus or addition perforations 62, 162, 262, and 363 so that it is possible to indicate "0000" in the windows 32, 132, 232, and 332 for starting a fresh calculation by mere means of reciprocating the laterally slidable rod 80 repeatedly.

A windowed longitudinally extended border plate 75 is provided between the ten place digit indicating mechanism and the hundred place digit indicating mechanism in such a manner that, while the claw levers 135 and 136 of the ten place digit indicating mechanism is protruded into the pitch circle of the gear 244 of the hundred place digit indicating mechanism through the window formed in the border plate 75 so as to drive the gear 244 by the claw levers 135 and 136, the claw levers 235 and 236 of the hundred place digit indicating mechanism are not protruded into the pitch circle of the gear 144 by being warded by the blind part of the border plate 75, so that the ten place digit indicating mechanism is not affected by the rotation of the hundred place digit indicating mechanism and the claw levers 235 and 236 are merely pivoted inwards against the action of springs 239 and 240. The claw levers 235 and 236 act on the open-side lantern wheel 344 of the thousand place digit indicating mechanism only. See FIG. 21.

The operation of this embodiment is quite similar to that of the preceding embodiment for operating addition. Even for the subtraction operation, it is only an additional procedure to position the knob 64 at the left position. For example, the following calculation will now be described.

(1)     4321+8765=13086

(2)     4321−1987=2334

The operation may be started with any place of the numeral, 4321. In general, it is started with the thousand place so that, provided that all windows show "0's" in their plus perforations 62, 162, 262, and 362, the knob 64 being in plus position, the push button 350 is pushed down four times whereby "4" is indicated in the thousand place digit indicating perforation 362. Then push button 250 is pushed down three times whereby "3" is indicated in the hundred place digit indicating perforation 262. Similarly, "2" and "1" are indicated in the ten place digit indicating perforation 162 and the unit place digit indicating perforation 62, respectively, complete registration of "4321" being thus effected. Then the push button 350 is pushed down eight times for adding "8" of the thousand place of the addend "8765" so that the thousand place digit indicating mechanism is rotated by eight teeth in the counterclockwise direction so as to bring the numeral "12" marked in the outer circle on the front surface of the thousand place digit indicating disk 334 into the indicating position just behind the plus perforation 362. By virtue of the special indication of the numerals of from "10" to "19" in the outer circle of the thousand place digit indicating disk 334, even being five figures, a sum up to "19999" may be handled by this four-figured calculator. Then the push button 250 is pushed down seven times so as to rotate the hundred place digit indicating mechanism by seven teeth in the clockwise direction for adding "7" of the hundred place of the addend "8765" whereby the "3" indicated in the hundred place digit indicating perforation 262 is changed to "0". When the "0" just appears in the perforation 262, a claw lever 235 or 236 is brought into engagement with the open-side lantern wheel 344 so as to drive the latter by one tooth whereby "13" is substituted for the "12" indicated in the thousand place. In view of the motion of the mechanisms, it is simpler to add "6" to "2" in the ten place and to add "5" to "1" in the unit place than the above described operation. Thus the answer of "13086" as the sum is obtained in the row of windows 32, 132, 232, and 332.

In order to operate subtraction, it is necessary to transfer the knob 64 to the left subtraction position whereby a minus sign appears in the operating window 60. Secondarily, the minuend "4321" is registered by pushing operations of buttons. In this case, it is necessary to register the digit of the unit place, "1," at first by pushing the button 50 of the unit place. The number of pushing operations is varied depending upon the preceding status. If the indication in the place has been for example, "7" and the minuend is "1," it is necessary to push the button 50 six times or "7"−"1"="6" times. Therefore, it is preferred to push the button while observing the corresponding window until the necessary digit will appear therein. Then the ten place digit, for example, "2" of the minuend "4321" is registered similarly in the ten place, followed by the similar manner for the registering operations for the hundred place digit "3" and the thousand place digit "4."

After the minuend "4321" has been registered in the series of the windows 32, 132, 232, and 332 trimmed by the minus perforations 63, 163, 263, and 363, the thousand digit "1" of the subtrahend "1987" is subtracted by pushing the push button 350 once whereby the "4" in the thousand place perforation 363 is changed to "3." Then the hundred place digit "9" of the subtrahend "1987" is subtracted by pushing the button 250 nine times whereby the "5" in the hundred place perforation 263 is changed to "4" through the indication of "0." In this case, when the indication becomes "0" as above, an outer end 241 or 242 of the claw lever 235 or 236 is brought into engagement with the open-side lantern wheel 344 of the one higher place indicating mechanism so as to drive the latter by one tooth whereby the indication of "3" in the thousand place is further changed to "2" being subtracted by "1." Then the ten place subtraction is operated by eight times pushing down of the push button 150. The indication of "2" in the ten place is changed to "4" through "0" which means the lacking of the minuend in that place as above operation in the hundred place so that a claw lever 135 or 136 acts on the gear 244 of the hundred place, ending in to subtract "1" from "4" indicated in the hundred place. Similarily the unit place push button 50 is operated seven times with a result of an indication of "4" in the unit place and a substitution of "3" for "4" in the ten place. Thus, after the operations as above, there is left an indication of "2334" in the overall windows. In the above operation, when the hundred place digit indication becomes "0," that is, when an outer end 241 or 242 of the claw lever 235 or 236 is brought into engagement with the lantern wheel 344 of the one higher place mechanism, the outer end of the other claw lever 235 or 236 approaches the gear 144 of the one lower place mechanism. However, by virtue of the provision of the border plate 75, the gear 144 is not affected by the claw lever 235 or 236 of the one higher place mechanism.

Upon positioning the knob 64 in the subtraction position, when the laterally slidable rod 80 is reciprocated several times, the overall indication becomes "000" with no indication in the thousand place, which means and is considered "20000" so that such a subtrahend as "19999" may be subtracted therefrom obtaining a difference of "1." The number of reciprocation varies depending upon the preceding indication from unnecessity to ten times. In an embodiment, the toothless parts 74, 174, 274, and 374 of the front ratchet wheels 73, 173, 273, and 373 are positioned in such a manner that, when the laterally slidable rod 80 becomes in the state of lost motion, the overall indication in the addition perforations 62, 162, 262, and 362 becomes "19999." When the indication becomes this largest number so that the laterally slidable rod 80 becomes idle, the operator may feel the lost motion by touch. In order to register "0000," it is then necessary to push the unit place button 50 once whereby the overall indication is changed to "0000."

FIGS. 23 to 27, inclusive, show still another embodiment which is quite similar to that shown in FIGS. 12 to 22. In this embodiment, the front ratchet wheels 73, 173, 273, and 373, pawl elements 55, 155, 255, and 355, and springs therefor 57, 157, 257, and 357 are somewhat modified on the preceding embodiment.

Referring now to FIGS. 28 and 29, which illustrate further another modified arrangement of a calculator embodying the principles of this invention. FIGURE 28 is a bottom view thereof. As shown therein, there are provided four digit indicating windows 32, 132, 232, and 332 and one operating window 60, in and through the bottom wall 90 of the casing 30 while they are provided in the front wall 31 in accordance with the preceding embodiment. The laterally slidable plate 61 having eight perforations 62, 162, 262, 362, 63, 163, 263, and 363 and a knob 64 is arranged above the bottom wall 90 inside the casing 30, protruding the konb 64 downwards through the operating window 60 as shown in FIG. 28 illustrating the minus position. The numerals to be exposed in the eight perforation are marked on the peripheral surfaces of four digit indicating disks 34, 134, 234, and 334 which would be rather termed cylinders. Each cylindrical surface carries two circumferential rows of two series of ten digits as shown in FIG. 29. The digits of one row are adapted to be exposed in the plus perforations for the adding operation and those of the other row are adapted for the subtracting operation. Other than the above, the overall mechanisms are quite similar to the preceding embodiment.

While particular embodiments of the invention have been illustrated and described, further modifications thereof will readily occur to those skilled in the art. It should be understood therefore that the invention is not limited to these particular constructions disclosed but that the appended claims are intended to cover all modifications which do not depart from the true spirit and scope of the invention.

What is claimed as new and desired to be secured by Letters Patent of the United States is:

1. A calculator comprising a casing having a number of windows formed in and through the wall thereof, a number of push buttons arranged out of said casing, and a number of digit indicating mechanisms provided inside said casing, each of said windows, push buttons, and digit indicating mechanisms being provided for each of places of numerals to be calculated, said digit indicating mechanism comprising a digit indicating disk, a tens-toothed gear, and a tens-toothed ratchet wheel, said digit indicating disk, said tens-toothed gear, and said tens-toothed ratchet wheel being integrated coaxially one after another and mounted rotatably inside said casing, said digit indicating disk being adapted to expose in said window any one of digits marked on a surface of said disk, said ratchet wheel being adapted to be rotated by one tooth thereof by pushing down said push button manually so as to change an exposed digit to the adjacent digit thereto, and said digit indicating mechanism further having at least one claw lever pivotally mounted upon the digit indicating disk of said mechanism, spring means for maintaining one end of said claw lever in a normally projected position whereby said one end will engage with said gear of said one higher place digit indicating mechanism to rotate the latter by one tooth thereof at least once during a complete revolution of said disk to effect at least one 10's carry, said spring means permitting said one end of said claw lever to pivot inwardly from said projected position towards the rotation axis of said digit indicating disk whenever said one higher place digit indicating mechanism is rotated in the same direction as that of said 10's carry with the gear teeth of said mechanism in contact with said claw lever, whereby rotation of said digit indicating mechanism by rotation of said one higher place digit indicating mechanism is prevented.

2. A calculator as claimed in claim 1, in which said digits marked on said disk consist of at least a series of digits of natural numbers having natural sequence and are arranged along a concentrically annular row on the front surface of said disk.

3. A calculator as claimed in claim 1, in which alternate ones of said digit indicating mechanisms are oppositely rotated.

4. A calculator as claimed in claim 1, in which said claw lever belonging to a digit indicating mechanism acts on said gear belonging to one higher place digit indicating mechanism when "0" is indicated by the first-named mechanism.

5. A calculator as claimed in claim 1, in which a pair of said claw levers are pivotally mounted on pivots protruding rearwards from two symmetrically arranged points on the rear surface of said digit indicating disk of alternate ones of said digit indicating mechanisms, the inner end of said claw lever being loaded with a leaf spring, of which the opposite end is fixed to said disk, so as to resiliently maintain the outer end of said claw lever extended beyond the periphery of said digit indicating disk in said normally projected position, and a pair of said claw levers are pivotally mounted on pivots protruded rearwards from two symmetrically arranged points on the rear surface of said gear of the others of said digit indicating mechanisms, the inner end of said claw lever being loaded with a leaf spring, of which the opposite end is fixed to said gear, so as to resiliently maintain the outer end of said claw lever extended beyond the periphery of said digit indicating disk in said normally projected position, the first-named inner end being adapted to engage with said gear belonging to one higher place digit indicating mechanism and the last-named inner end being adapted to engage with a gear arranged just behind said first-named claw levers belonging to one higher place digit indicating mechanism.

6. A calculator as claimed in claim 5, in which a border plate is provided between any adjacent two of said digit indicating mechanisms other than the lowest place and the highest place ones, said border plate having a window adapted to protrude said inner end of said claw lever of lower place digit indicating mechanism of said two digit indicating mechanisms into the pitch circle of said gear of higher place digit indicating mechanism of said two digit indicating mechanism through said window and warding protrusion of said inner end of said claw lever of higher place digit indicating mechanism of said two digit indicating mechanisms into the pitch circle of said gear of lower place digit indicating mechanism of said two digit indicating mechanisms.

7. A calculator as claimed in claim 1, in which said digits marked on said disk are arranged in two coaxial annular rows and consist of two series of digits of natural numbers, digits of one of said two rows having natural sequence and digits of the other of said two rows having opposite sequence thereto, a laterally slidable plate being provided just inside said windows formed in said wall of said casing, said laterally slidable plate having a knob and a number of sets of a plus perforation and a minus perforation, said plus perforation and said minus perforation being adapted to be overlaid with said windows alternatively by operating said knob externally so as to expose a digit of the inner row of said coaxial two through said plus perforation and of the outer row of said coaxial two through said minus perforation alternatively, said inner row being adapted for the adding calculation and said outer row being adapted for the subtracting calculation.

8. A calculator as claimed in claim 1, in which each of said digit indicating mechanisms is provided with one more ratchet wheel having at least a toothless part along its periphery and being integrated with said ten-toothed ratchet wheel coaxially, and said one more ratchet wheels being adapted to cooperate with claws resiliently and pivotally mounted on a laterally slidable rod arranged at the right angle to the axes of said mechanisms, respectively, so that each of said mechanisms is driven by said laterally slidable rod being reciprocated externally until said claw is brought into engagement with said toothless part, whereby a resetting operation is done.

9. A calculator as claimed in claim 1 in which a series of numerals of from 10 to 19 is substituted for a series of digits of from 0 to 9, respectively, in the highest place so as to expose the double number of the maximum number to be handled in view of the number of the places as a sum in said windows.

References Cited by the Examiner

UNITED STATES PATENTS

| | | | |
|---|---|---|---|
| 1,417,924 | 5/1922 | Koronski | 235—133 |
| 2,348,299 | 5/1944 | Josepho | 235—74 |
| 2,541,463 | 2/1951 | Cummins | 235—74 |

FOREIGN PATENTS 32,148   7/1885   Germany.

RICHARD B. WILKINSON, *Primary Examiner.*

S. A. WAL, *Assistant Examiner.*